United States Patent
Chen et al.

(10) Patent No.: US 11,080,348 B2
(45) Date of Patent: Aug. 3, 2021

(54) SYSTEM AND METHOD FOR USER-ORIENTED TOPIC SELECTION AND BROWSING

(71) Applicant: FUJIFILM Business Innovation Corp., Tokyo (JP)

(72) Inventors: Francine Chen, Menlo Park, CA (US); Jian Zhao, Cupertino, CA (US); Yin-Ying Chen, Sunnyvale, CA (US)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 667 days.

(21) Appl. No.: 15/616,810

(22) Filed: Jun. 7, 2017

(65) Prior Publication Data

US 2018/0357318 A1 Dec. 13, 2018

(51) Int. Cl.
G06F 16/9535 (2019.01)
G06F 16/9038 (2019.01)

(52) U.S. Cl.
CPC ...... *G06F 16/9535* (2019.01); *G06F 16/9038* (2019.01)

(58) Field of Classification Search
None
See application file for complete search history.

(56) References Cited

U.S. PATENT DOCUMENTS

| 6,484,168 | B1 * | 11/2002 | Pennock | G06F 16/30 |
| 7,213,198 | B1 * | 5/2007 | Harik | G06F 16/951 |
| | | | | 715/234 |
| 2007/0156732 | A1 * | 7/2007 | Surendran | G06Q 10/107 |
| 2008/0005137 | A1 * | 1/2008 | Surendran | G06N 20/00 |
| 2011/0060983 | A1 * | 3/2011 | Cai | G06F 16/9562 |
| | | | | 715/254 |
| 2011/0131207 | A1 * | 6/2011 | Jonsson | G06Q 10/107 |
| | | | | 707/730 |
| 2015/0046151 | A1 * | 2/2015 | Lane | G06F 16/93 |
| | | | | 704/9 |
| 2015/0161248 | A1 * | 6/2015 | Majkowska | G06F 16/35 |
| | | | | 707/737 |

(Continued)

OTHER PUBLICATIONS

Kumar, A.V. Senthil. Knowledge Discovery Practices and Emerging Applications of Data Mining: Trends and New Domains. Idea Group Inc (IGI), Aug. 31, 2010. ISBN: 9781609600693. pp. 29. (Year: 2010).*

(Continued)

*Primary Examiner* — Irene Baker
(74) *Attorney, Agent, or Firm* — Procopio, Cory, Hargreaves & Savitch LLP

(57) ABSTRACT

A method and device for displaying a plurality of content items may be shown. The method may include detecting at least one topic associated with each of the plurality of content items, generating a set of topics based on the at least one topic associated with each of the plurality of content items, the set of topics comprising a number of topics associated with the plurality of content items, reducing the number of topics in the set of topics, by combining one of the number of topic in response to a determination that at least one topic in the set of topics is redundant, and generating a visualization, the visualization including at least one content item from the plurality of content items; and the set of topics.

14 Claims, 7 Drawing Sheets

(56) References Cited

U.S. PATENT DOCUMENTS

2016/0335345 A1* 11/2016 Wang .................. G06F 16/367
2018/0096062 A1* 4/2018 Lorge .................. G06F 16/367

OTHER PUBLICATIONS

Alexander, Eric, et al., "Serendip: Topic Model-Driven Visual Exploration of Text Corpora", 10 pages, VAST '14.

Cao, Juan, et al., "A Density-Based Method for Adaptive LDA Model Selection", 7 pages, Copyright 2008 Elsevier B.V. Aug. 1, 2007. Neurocomputing 72 (2009) 1775-1781.

Chang, Jonathan, et al., "Reading Tea Leaves: How Humans Interpret Topic Models", 10 pages, Neural Information Processing Systems, 2009.

Dumais, Susan, et al., "Stuff I've Seen: A System for Personal Information Retrieval and Re-Use", 8 pages, ACM SIGIR Forum, vol. 49, No. 2, Dec. 2015.

Deveaud, Romain, et al., Accurate and effective latent concept modeling for ad hoc information retrieval. Document numérique 2014 25 pages.

Li, Shaohua, et al., "Generative Topic Embedding: a Continuous Representation of Documents", 10 pages. Date: Jun. 9, 2016 ACL 2016.

Arun, R., et al., "On Finding the Natural Number of Topics with Latent Dirichlet Allocation: Some Observations", 12 pages, PAKDD 2010, Part I, LNAI 6118, pp. 391-402, 2010. Copyright 2010 Springer-Verlag Berlin Heidelberg.

Chuang, Jason, et al., "Termite: Visualization Techniques for Assessing Textual Topic Models", 4 pages. AVI '12, May 21-25, Capri Island, Italy, Copyright 2012 ACM 978-1-4503-1287—May 12, 2005.

Dou, Wenwen et al., "ParallelTopics: A probabilistic approach to exploring document collections." In Proceedings of the IEEE Conference on Visual Analytics Science and Technology (VAST), pp. 231-240, 2011.

* cited by examiner

SYSTEM AND METHOD FOR USER-ORIENTED TOPIC SELECTION AND BROWSING

BACKGROUND

Field

The present disclosure relates to content viewing systems and methods, and more specifically, to systems and methods of selecting and browsing content items in a content viewing system.

Related Art

In some related art document management systems and content viewing systems, documents and other content may be classified by computing topics (e.g., topic probabilities) associated with the documents and other content. When performing computing of topics, topic models, such as Latent Dirichlet Allocation (LDA), may be used to compute topics. However, these types of related art topic models may require that a number of topics be specified. For example, when the number of topics is too few, some topics have been improperly combined, which can cause understanding of the topics to be more difficult for a user. Conversely, when the number of topics is too many, the topics may appear redundant to a user.

Related art systems may compute a measure of the quality of the topics while varying the number of topics and select the topics based on the measure. However, this can be computationally intensive and may not match a user's perception of the topics.

Additionally, related art approaches to finding information in document management systems and content viewing systems may involve either searching using a query of terms or presenting the information in a browsing interface. For example, one related art system allows users to specify a query and then manipulate the results in a targeted corpus of personal documents.

SUMMARY OF THE DISCLOSURE

Aspects of the present disclosure may include a method of displaying a plurality of content items. The method may include detecting at least one topic associated with each of the plurality of content items, generating a set of topics based on the at least one topic associated with each of the plurality of content items, the set of topics comprising a number of topics associated with the plurality of content items, reducing the number of topics in the set of topics, by combining one of the number of topics in response to a determination that at least one topic in the set of topics is redundant, and generating a visualization, the visualization including at least one content item from the plurality of content items; and the set of topics.

Additional aspects of the present disclosure may include a non-transitory computer readable medium having stored therein a program for making a computer execute a method of displaying a plurality of content items. The method may include detecting at least one topic associated with each of the plurality of content items, generating a set of topics based on the at least one topic associated with each of the plurality of content items, the set of topics comprising a number of topics associated with the plurality of content items, reducing the number of topics in the set of topics, by combining one of the number of topic in response to a determination that at least one topic in the set of topics is redundant, and generating a visualization, the visualization including at least one content item from the plurality of content items; and the set of topics.

Additional aspects of the present disclosure may also include a computing device configured to display a plurality of content items. The computing device may include a memory configured to store a plurality of content items, a processor, and a display device configured to display a generated visualization. The process may be configured to execute a process including detecting at least one topic associated with each of the plurality of content items, generating a set of topics based on the at least one topic associated with each of the plurality of content items, the set of topics comprising a number of topics associated with the plurality of content items, and reducing the number of topics in the set of topics, by combining one of the number of topic in response to a determination that at least one topic in the set of topics is redundant. The generated visualization may include at least one content item from the plurality of content items, and the set of topics.

Additional aspects of the present disclosure may also include another computing device configured to display a plurality of content items. The computing device may include means for storing a plurality of content items, means for detecting at least one topic associated with each of the plurality of content items, means for generating a set of topics based on the at least one topic associated with each of the plurality of content items, the set of topics comprising a number of topics associated with the plurality of content items, means for reducing the number of topics in the set of topics, by combining one of the number of topic in response to a determination that at least one topic in the set of topics is redundant, and means for displaying a generated visualization. The generated visualization may include at least one content item from the plurality of content items, and the set of topics.

DETAILED DESCRIPTION

Figure 1:
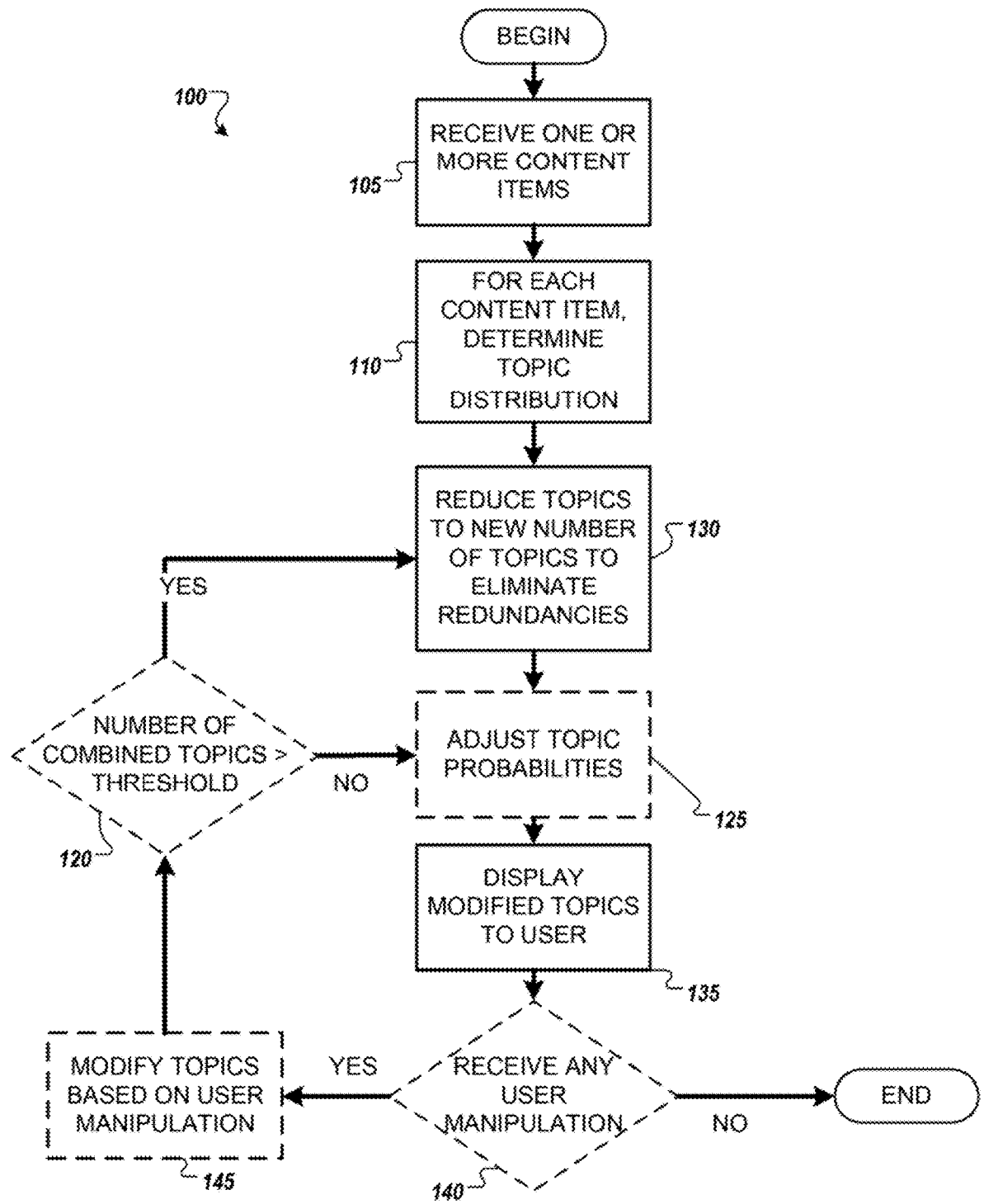
FIG. 1 illustrates a flowchart of a process of user-oriented topic browsing according to example implementations of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

With large online document collections such as document management systems, chat systems, or blog systems, automatically assigning topics to assist with classification and searching of the documents may assist with document review or user education. Topic modeling based on detected content features, such as words, images, etc. may be used to automatically assign topics. When computing topics for document or content collections using models, such as LDA, the number of topics needs to be specified. However, determining the number of topics may affect the usability of the system. For example, when the number of topics is too few, some topics may be combined, making understanding of the topics more difficult for a user. Conversely, when the number of topics is too many, the topics may appear redundant to a user. Example implementations may optimize a relevance measure of the topics while varying the number of topics based on the content detected from the content items. Additionally, in some example implementations, once the topics are identified, the topics may then be presented in an interactive interface to allow viewing of both the topics and the content items related to the topics specified to be of interest.

In some example implementations, a targeted set of "documents" for analysis may include unstructured posts in a chat channel, chat board posts, blog posts or any other type of document that might be apparent to a person of ordinary skill in the art. In the example implementations, a topic-oriented system for supporting a user in understanding information in that channel, board or blog may be provided. Specifically, in example implementations, a clustering algorithm, (e.g., LDA), which performs a soft clustering so that a document may be characterized by more than a single topic, may be used to assign one or more topics to each document.

As mentioned above, clustering algorithms such as LDA may require that number of topics to be specified. In example implementations, the number of topics to be presented to the user may be automatically determined based on relevance of the topics to the documents being analyzed.

Additionally, when users view a set of topics, they may focus on the terms characterizing the topics, rather than the probabilities associated with the topics, even if the probabilities vary significantly. Since the most frequent terms are often presented to characterize a topic, example implementations may focus on the terms presented to a user to determine which topics are too similar to be considered separate topics (e.g., redundant topics) and can be grouped into a "super-topic".

Once topics are grouped to remove "redundancies" so that users need not identify which topics are redundant, users may only be interested in some of the topics. Example implementations may also provide a User Interface for presenting and interacting with the identified topics. By eliminating redundant topics initially, significant computing power may be saved reducing visualization render times from hours to minutes.

FIG. 1 illustrates a flowchart of a process 100 of user-oriented topic browsing according to example implementations of the present application. The illustrated process 100 may be performed by a processor (such as processors 710) of a device (such as computing device 705 of FIG. 7) to provide topic calculation and user-oriented browsing. In process 100, a one or more content items may be received or detected at 105. The one or more content items may be a chat post, blog post, instant message, email message, social media post, or any other type of document that might be apparent to a person of ordinary skill in the art. The content item may include text, audio, image, video or any other type of content that might be apparent to a person of ordinary skill in the art.

After the one or more content items are received or detected, each content item is analyzed to determine a topic distribution. The topic distribution may be determined by extracting content features from each content item and assigning a topic distribution based on the extracted content features.

The extraction of the content features is not particularly limited and may include applying object recognition techniques (e.g., object recognition, facial recognition, character recognition, etc.) to images or videos associated with the content item to identify the visual content. Additionally, audio recognition techniques (e.g., audio event detection, audio characteristic classification, speech recognition, etc.) may be used to detect the audio content associated with the content item. Additionally, subject matter recognition algorithms may be used to detect subjects or topics of textual content of the content item. The extracted content features may also include other types of features about the content item such as location of capture or authorship (e.g., GPS data, etc.) or any other content features that might be apparent to a person of ordinary skill in the art. All extracted content features may be associated with a series of words (e.g., a textual description of each content item). A variety of soft-clustering topic models could be used to assign topic distributions. For example, a topic embedding model, which combines the Latent Dirichlet Allocation (LDA) model together with a probabilistic word embedding model, may be used. Though LDA is discussed as an example clustering algorithm, other soft clustering algorithms may be used as may be apparent to a person of ordinary skill in the art.

Figure 2:
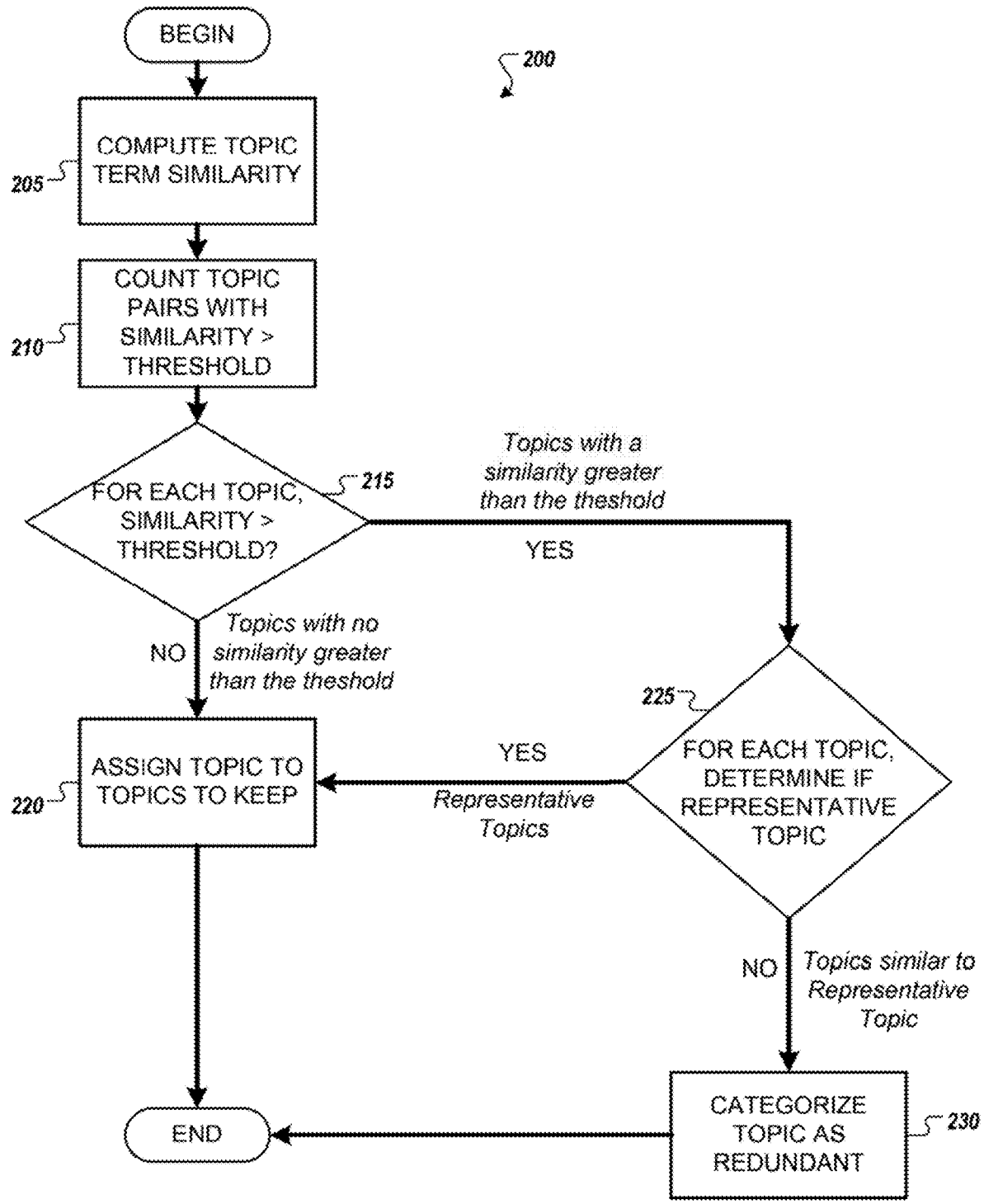
FIG. 2 illustrates a flow chart of a process of reducing topics to eliminate redundant topics according to example implementations of the present application.

After the topic distribution is determined for each content item, the number of topics in the topic set may be reduced by eliminating any redundant topics at 130. FIG. 2 discussed below illustrates an example process that may be used to reduce the number of topics in the combined topics that to eliminate redundancies.

In some example implementations, the topic probabilities may optionally be based on the associations between the content items and the reduced topics at 125. For example the probabilities may need to be adjusted to reflect the revised groupings. If probabilities are not presented to be in the UI discussed below, then the "documents" or "posts" can be combined into a "super-topic". In some example implementations, the "documents" or "posts" can be combined whether or not probabilities are to be displayed. If term or topic probabilities are presented, then the probabilities may need to be adjusted. If time is not crucial, the topics can be recomputed with the new number of topics. If time is crucial, then the probabilities associated with topics in a group can be approximated as follows:

For each topic, t, and each word, the word distribution of the topic, Pr(w|t) may be known. Further, for each document, d, the topic distribution of the document, Pr(t|d) may also be known. In some example implementations, Pr(t|d) and Pr(w|t) may be learned from the topic model. For example, they may be parameters of the Latent Dirichlet Allocation (LDA) model, e.g., see $\theta_m$ and $\varphi_k$, for example.

Then, Pr(t) is first calculated assuming each document is equally likely, (e.g., has a probability 1/D, where D is the number of documents). Thus, $$Pr(t_i) = \frac{\Sigma_j \, Pr(t_i \mid d_j)}{D} \quad \text{(Equation 1)}$$

Then, the probability of each word in the grouped topic, t' is then computed as:

$$Pr(w \mid t') = \frac{\Sigma_{t_i \in N} Pr(w \mid t_i) Pr(t_i)}{\Sigma_{t_i \in N} Pr(t_i)} \quad \text{(Equation 2)}$$

Since the set of words in the grouped topic may be more than the number of words per topic, only the terms in the representative topics for the group may be presented. Alternatively, the lowest probability words may be removed.

Thus, the probability of a grouped topic in a document may simply be computed as:

$$Pr(t' \mid d_j) = \sum_i Pr(t_i \mid d_j) \quad \text{(Equation 3)}$$

In some example implementations, an optional post-processing step may be used to group similar terms, where similarity may be measured in a number of ways, such as distance in a word embedding space, e.g., word2vec, or on WordNet. The words could be listed as a group, along with the sum of their probabilities. For example, for an example topic "19" illustrated below, terms "recorded", "recording" and "recordings' could be combined into one super "term" with a probability of 0.04+0.04+0.04.

Topic 19 (think 0.08)(recorded 0.04)(recording 0.04)(recordings 0.04)(meeting 0.04)(working 0.03)(show 0.03)(order 0.03)(format 0.03)(given 0.03)

Once the topic probabilities have been adjusted, the process 100 may proceed to 135 and the combined topics, and the associated content items, may be displayed to a user using a UI, such as UI 400 illustrated in FIG. 4 below. The process may then proceed from 135 forward as discussed below.

In some example implementations, the process 100 may proceed directly from 130 to 125, such that after the number of topics is reduced, the combined topics, and the associated content items, may be displayed to a user using a UI, such as UI 400 illustrated in FIG. 4 below, at 135.

In some example implementations, after the combined topics are displayed to the user on the UI, a determination is made whether any user manipulations have been requested through the UI at 140. For example, a user may use the UI to select one or more topics from the combined topics. If no user manipulation is received (NO at 140), the process 100 may end.

Conversely, if a user manipulation is received (YES at 140), the combined topic set may be modified at 145 based on the user manipulation. For example, if the user selects one or more topics from the combined topic set, any unselected topics may be removed from the combined topic set. Based on the requested user manipulation, a determination is made at 120, whether the number of topics in the combined topic set after the user manipulation exceeds a threshold value. The threshold value may be a user selected value or it may be an administrator selected value in some example implementations. Additionally, in some example of implementations, the threshold value may be automatically determined by the document management system or content viewing system based on automated analysis.

If the number of topics in the combined topics after the user manipulation is greater than the threshold value (e.g., YES at 120), the number of topics in the combined topics that again reduced by eliminating any redundant topics at 130 as discussed above and the process 100 may proceed forward from there. Conversely, if the combined topics after the user manipulation are not greater than the threshold value (e.g., NO at 120), the topic probabilities may again be adjusted at 125 and the process may proceed forward from there.

FIG. 2 illustrates a flow chart of a process 200 of reducing topics to eliminate redundant topics according to example implementations of the present application. The illustrated process 200 may be performed by a processor (such as processors 710) of a device (such as computing device 705 of FIG. 7) to provide topic calculation and user-oriented browsing. Process 200 may be performed as part of a process of user-oriented topic browsing, such as process 100 discussed above.

As discussed above, to compute the topics in example implementations, a variety of soft-clustering topic models could be used. In some example implementations, a larger number of topics than a user may wish to view may be started with and number reduced using the process 200. For example, twenty topics (listed as 0-19 below) may initially be specified and reduced using the process 200 as discussed below.

TABLE 1

| 0 (first 0.18) | (building 0.04) | (line 0.05) | (top 0.03) | (events 0.01) |
|---|---|---|---|---|
| 1 (order 0.05) | (janus 0.05) | (show 0.04) | (format 0.04) | (given 0.04) |
| 2 (line 0.07) | (first 0.05) | (building 0.03) | (top 0.02) | (set 0.02) |
| 3 (yes 0.04) | (cors 0.03) | (transactional 0.03) | (value 0.02) | (need 0.03) |
| 4 (first 0.04) | (line 0.05) | (now 0.04) | (building 0.02) | (top 0.02) |
| 5 (server 0.12) | (stores 0.03) | (store 0.03) | (php 0.03) | (cookies 0.03) |
| 6 (sets 0.10) | (same 0.10) | (restart 0.10) | (now 0.10) | (way 0.10) |
| 7 (line 0.07) | (first 0.05) | (top 0.02) | (building 0.02) | (set 0.02) |
| 8 (first 0.05) | (line 0.06) | (building 0.03) | (top 0.02) | (different 0.02) |
| 9 (sounds 0.12) | (post 0.12) | (like 0.12) | (yes 0.12) | (line 0.00) |
| 10 (espresso 0.04) | (hard 0.04) | (empty 0.04) | (understand 0.04) | (actually 0.04) |
| 11 (first 0.06) | (line 0.05) | (building 0.02) | (top 0.02) | (now 0.04) |
| 12 (ok 0.10) | (thanks 0.05) | (great 0.05) | (place 0.04) | (bunch 0.04) |
| 13 (basic 0.10) | (auth 0.05) | (authorization 0.05) | (posterity 0.05) | (answer 0.05) |
| 14 (head 0.26) | (opens 0.05) | (recognition 0.04) | (speech 0.04) | (going 0.04) |
| 15 (page 0.04) | (login 0.03) | (url 0.03) | (like 0.03) | (go 0.02) |

TABLE 1-continued

| | | | | | |
|---|---|---|---|---|---|
| 16 | (first 0.05) | (line 0.05) | (top 0.02) | (building 0.02) | (set 0.03) |
| 17 | (first 0.05) | (line 0.06) | (building 0.03) | (set 0.03) | (same 0.02) |
| 18 | (try 0.11) | (setting 0.05) | (work 0.05) | (resume 0.02) | (doctor 0.02) |
| 19 | (recorded 0.04) | (think 0.08) | (recording 0.04) | (recordings 0.04) | (meeting 0.04) |
| 0 | (same 0.02) | (now 0.03) | (viz 0.01) | (set 0.01) | (soon 0.01) |
| 1 | (working 0.04) | (recorded 0.03) | (laurent 0.05) | (recording 0.03) | (meeting 0.03) |
| 2 | (now 0.03) | (different 0.02) | (same 0.02) | (matter 0.01) | (viz 0.01) |
| 3 | (access 0.02) | (mean 0.02) | (api 0.02) | (see 0.02) | (npm 0.01) |
| 4 | (same 0.02) | (matter 0.02) | (set 0.02) | (different 0.02) | (data 0.02) |
| 5 | (similar 0.03) | (js 0.02) | (html 0.02) | (language 0.02) | (using 0.02) |
| 6 | (line 0.00) | (first 0.00) | (set 0.00) | (building 0.00) | (top 0.00) |
| 7 | (same 0.02) | (different 0.02) | (now 0.03) | (matter 0.01) | (events 0.01) |
| 8 | (set 0.02) | (same 0.02) | (now 0.03) | (matter 0.01) | (events 0.01) |
| 9 | (first 0.00) | (building 0.00) | (now 0.1) | (different 0.00) | (set 0.00) |
| 10 | (statements 0.03) | (shared 0.03) | (seems 0.03) | (image 0.03) | (helps 0.03) |
| 11 | (matter 0.02) | (set 0.02) | (different 0.02) | (same 0.02) | (viz 0.01) |
| 12 | (wherever 0.03) | (people 0.03) | (wonder 0.03) | (feel 0.02) | (cool 0.02) |
| 13 | (use 0.05) | (email 0.05) | (password 0.05) | (control 0.02) | (oh 0.01) |
| 14 | (google 0.02) | (access 0.03) | (api 0.02) | (techcrunch 0.01) | (nuance 0.00) |
| 15 | (tokens 0.02) | (cookie 0.02) | (post 0.02) | (password 0.02) | (need 0.02) |
| 16 | (now 0.03) | (different 0.02) | (same 0.02) | (events 0.01) | (matter 0.01) |
| 17 | (now 0.03) | (top 0.02) | (different 0.02) | (matter 0.01) | (sets 0.01) |
| 18 | (normal 0.02) | (runs 0.02) | (time 0.02) | (patient 0.02) | (next 0.02) |
| 19 | (working 0.03) | (show 0.03) | (order 0.03) | (format 0.03) | (given 0.03) |

Table 1 above illustrates an example of twenty topics and the probabilities associated with keywords associated with each of the topics. In Table 1, the top 10 keywords or terms per topic are shown. Note that some of the topics have some identical terms, (e.g., topic 0 and topic 4 each contain some of the same keywords), but the topic analysis model may assign different probabilities to the shared terms. However, a user generally considers topics with the same top terms as similar and redundant even if the probabilities are different. Thus, eliminating redundant terms and keeping only one of the topics using the process 200 may be sufficient to represent the topics associated with the documents.

In the process 200, a similarity matrix using a presence/absence similarity measure, such as the Jaccard similarity, is calculated between each pair of topics in the combined topic set at 205. Table 2 below illustrates a Jaccard similarity matrix for the topics in Table 1 above. In some example implementations, a threshold, T, may be set for when the similarity is too high to keep two topics as separate topics. For example, the threshold may be set as T=0.5 to prevent two topics with more than 50% overlap of terms.

At 210, the number of other topics (cnt) for which the similarity is greater than T is counted for each given topic. In Table 2, the "cnt" column represents the number of other topics for which similarity is greater than T for each topic. Additionally, the sum of the similarities that are greater than T (e.g., total similarity) are shown under the 'tot' column for each topic in Table 2.

TABLE 2

| | 0 | 1 | 2 | 3 | 4 | 5 | 6 | 7 | 8 | 9 | 10 | 11 |
|---|---|---|---|---|---|---|---|---|---|---|---|---|
| 0 | — | 0.00 | 0.67 | 0.00 | 0.54 | 0.00 | 0.54 | 0.67 | 0.67 | 0.33 | 0.00 | 0.67 |
| 1 | 0.00 | — | 0.00 | 0.00 | 0.00 | 0.00 | 0.00 | 0.00 | 0.00 | 0.00 | 0.00 | 0.00 |
| 2 | 0.67 | 0.00 | — | 0.00 | 0.82 | 0.00 | 0.54 | 0.82 | 0.82 | 0.43 | 0.00 | — |
| 3 | 0.00 | 0.00 | 0.00 | — | 0.00 | 0.00 | 0.00 | 0.00 | 0.00 | 0.05 | 0.00 | 0.00 |
| 4 | 0.54 | 0.00 | 0.82 | 0.00 | — | 0.00 | 0.54 | 0.82 | 0.82 | 0.43 | 0.00 | 0.82 |
| 5 | 0.00 | 0.00 | 0.00 | 0.00 | 0.00 | — | 0.00 | 0.00 | 0.00 | 0.00 | 0.00 | 0.00 |
| 6 | 0.54 | 0.00 | 0.54 | 0.00 | 0.54 | 0.00 | — | 0.54 | 0.54 | 0.33 | 0.00 | 0.54 |
| 7 | 0.67 | 0.00 | 0.82 | 0.00 | 0.82 | 0.00 | 0.54 | — | — | 0.43 | 0.00 | 0.82 |
| 8 | 0.67 | 0.00 | 0.82 | 0.00 | 0.82 | 0.00 | 0.54 | — | — | 0.43 | 0.00 | 0.82 |
| 9 | 0.33 | 0.00 | 0.43 | 0.05 | 0.43 | 0.00 | 0.33 | 0.43 | 0.43 | — | 0.00 | 0.43 |
| 10 | 0.00 | 0.00 | 0.00 | 0.00 | 0.00 | 0.00 | 0.00 | 0.00 | 0.00 | 0.00 | — | 0.00 |
| 11 | 0.67 | 0.00 | — | 0.00 | 0.82 | 0.00 | 0.54 | 0.82 | 0.82 | 0.43 | 0.00 | — |
| 12 | 0.00 | 0.00 | 0.00 | 0.00 | 0.00 | 0.00 | 0.00 | 0.00 | 0.00 | 0.00 | 0.00 | 0.00 |
| 13 | 0.00 | 0.00 | 0.00 | 0.00 | 0.00 | 0.00 | 0.00 | 0.00 | 0.00 | 0.00 | 0.00 | 0.00 |
| 14 | 0.00 | 0.00 | 0.00 | 0.11 | 0.00 | 0.00 | 0.00 | 0.00 | 0.00 | 0.00 | 0.00 | 0.00 |
| 15 | 0.00 | 0.00 | 0.00 | 0.05 | 0.00 | 0.00 | 0.00 | 0.00 | 0.00 | 0.11 | 0.00 | 0.00 |
| 16 | 0.67 | 0.00 | 0.82 | 0.00 | 0.82 | 0.00 | 0.54 | — | — | 0.43 | 0.00 | 0.82 |
| 17 | 0.54 | 0.00 | 0.82 | 0.00 | 0.82 | 0.00 | 0.67 | 0.82 | 0.82 | 0.43 | 0.00 | 0.82 |
| 18 | 0.00 | 0.00 | 0.00 | 0.00 | 0.00 | 0.00 | 0.00 | 0.00 | 0.00 | 0.00 | 0.00 | 0.00 |
| 19 | 0.00 | 0.67 | 0.00 | 0.00 | 0.00 | 0.00 | 0.00 | 0.00 | 0.00 | 0.00 | 0.00 | 0.00 |

| | 12 | 13 | 14 | 15 | 16 | 17 | 18 | 19 | cnt | tot |
|---|---|---|---|---|---|---|---|---|---|---|
| 0 | 0.00 | 0.00 | 0.00 | 0.00 | 0.67 | 0.54 | 0.00 | 0.00 | 8 | 4.95 |
| 1 | 0.00 | 0.00 | 0.00 | 0.00 | 0.00 | 0.00 | 0.00 | 0.67 | 1 | 0.67 |
| 2 | 0.00 | 0.00 | 0.00 | 0.00 | 0.82 | 0.82 | 0.00 | 0.00 | 8 | 6.30 |
| 3 | 0.00 | 0.00 | 0.11 | 0.05 | 0.00 | 0.00 | 0.00 | 0.00 | 0 | 0.00 |

TABLE 2-continued

| | | | | | | | | | | |
|---|---|---|---|---|---|---|---|---|---|---|
| 4 | 0.00 | 0.00 | 0.00 | 0.00 | 0.82 | 0.82 | 0.00 | 0.00 | 8 | 5.99 |
| 5 | 0.00 | 0.00 | 0.00 | 0.00 | 0.00 | 0.00 | 0.00 | 0.00 | 0 | 0.00 |
| 6 | 0.00 | 0.00 | 0.00 | 0.00 | 0.54 | 0.67 | 0.00 | 0.00 | 8 | 4.44 |
| 7 | 0.00 | 0.00 | 0.00 | 0.00 | — | 0.82 | 0.00 | 0.00 | 8 | 6.48 |
| 8 | 0.00 | 0.00 | 0.00 | 0.00 | — | 0.82 | 0.00 | 0.00 | 8 | 6.48 |
| 9 | 0.00 | 0.00 | 0.00 | 0.11 | 0.43 | 0.43 | 0.00 | 0.00 | 0 | 0.00 |
| 10 | 0.00 | 0.00 | 0.00 | 0.00 | 0.00 | 0.00 | 0.00 | 0.00 | 0 | 0.00 |
| 11 | 0.00 | 0.00 | 0.00 | 0.00 | 0.82 | 0.82 | 0.00 | 0.00 | 8 | 6.30 |
| 12 | — | 0.00 | 0.00 | 0.00 | 0.00 | 0.00 | 0.00 | 0.00 | 0 | 0.00 |
| 13 | 0.00 | — | 0.00 | 0.05 | 0.00 | 0.00 | 0.00 | 0.00 | 0 | 0.00 |
| 14 | 0.00 | 0.00 | — | 0.00 | 0.00 | 0.00 | 0.00 | 0.00 | 0 | 0.00 |
| 15 | 0.00 | 0.05 | 0.00 | — | 0.00 | 0.00 | 0.00 | 0.00 | 0 | 0.00 |
| 16 | 0.00 | 0.00 | 0.00 | 0.00 | — | 0.82 | 0.00 | 0.00 | 8 | 6.48 |
| 17 | 0.00 | 0.00 | 0.00 | 0.00 | 0.82 | — | 0.00 | 0.00 | 8 | 6.11 |
| 18 | 0.00 | 0.00 | 0.00 | 0.00 | 0.00 | 0.00 | — | 0.00 | 0 | 0.00 |
| 19 | 0.00 | 0.00 | 0.00 | 0.00 | 0.00 | 0.00 | 0.00 | — | 1 | 0.67 |

In the process 200, for each topic the similarity value with respect to the other topics is compared to the threshold T at 215. If the topic does not have any similarity values that are greater than the threshold T (NO at 215), the topic is considered unique (e.g., non-redundant) is assigned to a non-redundant set of topics to be kept and displayed to a user at 220. After the topic is assigned to the non-redundant set of topics to be kept, the process 200 may end with respect to that topic. In Table 2, topics {3, 5, 9, 10, 12, 13, 14, 15, 18} may be identified as non-redundant and assigned to the non-redundant set of topics.

Figure 3:
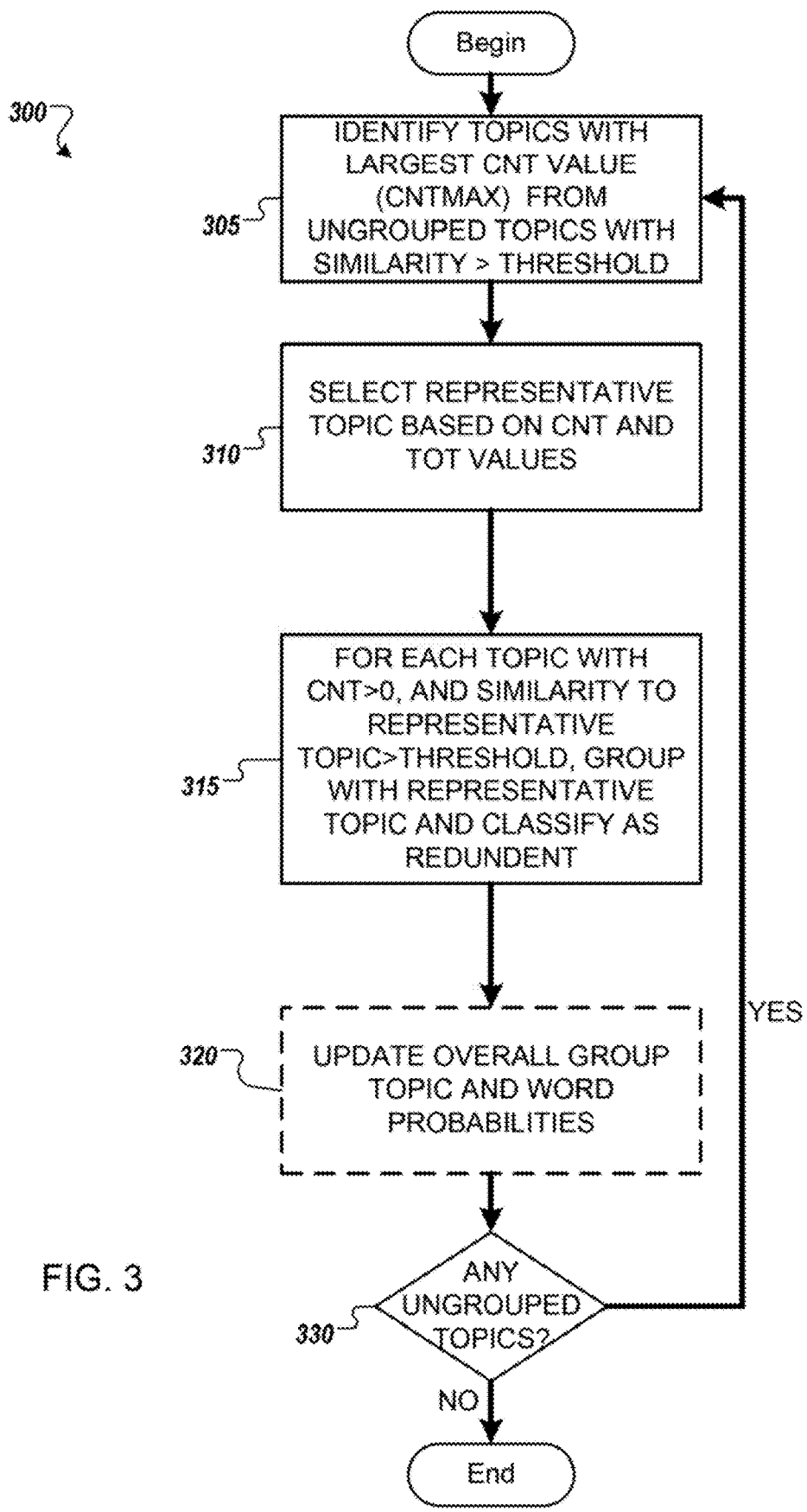
FIG. 3 illustrates a flow chart of a process of selecting a representative topic from a number of similar topics according to example implementations of the present application.

Returning to 215, all topics that have a similarity value with respect to the other topics (YES at 215) that exceeds the threshold T are considered as potentially being redundant and each topic is evaluated to determine if representative of the potentially redundant topics at 225. FIG. 3 discussed below illustrates an example process for determining representative topics from the potentially redundant topics.

If a topic is determined to be representative (YES at 225), the topic is assigned to the non-redundant set of topics to be kept and displayed to a user at 220. After the topic is assigned to the non-redundant set of topics to be kept, the process 200 may end with respect to that topic.

Conversely, if a topic is determined to not be representative (NO at 225), the topic may be categorized as redundant at 230, the process 200 may end with respect to that topic. In some example implementations, redundant topics may be saved, but not displayed at 230. In some example implementations, the redundant topics may be discarded.

FIG. 3 illustrates a flow chart of a process 300 of selecting a representative topic from a number of similar topics according to example implementations of the present application. The illustrated process 300 may be performed by a processor (such as processors 710) of a device (such as computing device 705 of FIG. 7) to identify representative topics. Process 300 may be performed as part of a process of reducing redundant topics, such as at 225 of process 200 discussed above.

In the process 300, all the topics having similarity values exceeding the threshold are evaluated to identify which topics are associated with cnt values (e.g., the number of other topics for which the similarity is greater than threshold) that are the largest (e.g., cntmax) at 305. As discussed above, in Table 2, the "cnt" column represents the number of other topics for which similarity is greater than T (e.g., the cnt value) for each topic. With respect to the data illustrated in Table 2 above, the largest cnt value is 8 (e.g., cntmax=8) and is associated with topics {0, 1, 2, 4, 6, 7, 8, 11, 16, 17, 19}. In an example implementation, these topics may be selected at 305 for consideration as a representative topic as discussed below with respect to 310. The data also illustrates that topics {1, 19} have non-zero cnt values (e.g., cnt=1) and similarity values exceeding the threshold T. These topics not selected for consideration as representative topics as discussed below considered in 310, but are considered as potentially being redundant as discussed in greater detail below at 315.

After the topics having the largest cnt value are identified, one topic is identified as a representative topic based on both the values of cnt and total similarity associated with each topic at 310. As discussed above, the total similarity is equal to the sum of the similarities associated with each topic and is shown under the 'tot' column for each topic in Table 2. In some example implementations, the topic having the largest value of both cnt and tot may be selected from the identified topics as a representative topic.

As illustrated in the example data of Table 2, topics {0, 2, 4, 6, 7, 8, 11, 16, 17} all have the largest cnt values (e.g., cnt=cntmax (8)). Further, Table 2 illustrates that of these topics, topics {7, 8, 16} have the largest total similarity values (tot=6.48). One of these topics may be selected as representative topics. In some example implementations, if there is a tie, the tie can be broken using another measure, (e.g., cosine similarity), or one of the top topics randomly selected. Table 3 below illustrates tie-breaking using cosine similarity.

TABLE 3

| | 0 | 1 | 2 | 3 | 4 | 5 | 6 | 7 | 8 | 9 | 10 | 11 |
|---|---|---|---|---|---|---|---|---|---|---|---|---|
| 0 | — | 0.000 | 0.736 | 0.000 | 0.681 | 0.000 | 0.100 | 0.743 | 0.770 | 0.000 | 0.000 | 0.823 |
| 1 | 0.000 | — | 0.000 | 0.000 | 0.000 | 0.000 | 0.000 | 0.000 | 0.000 | 0.000 | 0.000 | 0.000 |
| 2 | 0.736 | 0.000 | — | 0.000 | 0.946 | 0.000 | 0.223 | 0.980 | 0.982 | 0.000 | 0.000 | 0.968 |
| 3 | 0.000 | 0.000 | 0.000 | — | 0.000 | 0.000 | 0.000 | 0.000 | 0.000 | 0.259 | 0.000 | 0.000 |
| 4 | 0.681 | 0.000 | 0.946 | 0.000 | — | 0.000 | 0.314 | 0.940 | 0.953 | 0.000 | 0.000 | 0.943 |
| 5 | 0.000 | 0.000 | 0.000 | 0.000 | 0.000 | — | 0.000 | 0.000 | 0.000 | 0.000 | 0.000 | 0.000 |
| 6 | 0.100 | 0.000 | 0.223 | 0.000 | 0.314 | 0.000 | — | 0.220 | 0.245 | 0.000 | 0.000 | 0.250 |
| 7 | 0.743 | 0.000 | 0.980 | 0.000 | 0.940 | 0.000 | 0.220 | — | 0.992 | 0.000 | 0.000 | 0.952 |

TABLE 3-continued

| | 0 | 1 | 2 | 3 | 4 | 5 | 6 | 7 | 8 | 9 | 10 | 11 |
|---|---|---|---|---|---|---|---|---|---|---|---|---|
| 8 | 0.770 | 0.000 | 0.982 | 0.000 | 0.953 | 0.000 | 0.245 | 0.992 | — | 0.000 | 0.000 | 0.972 |
| 9 | 0.000 | 0.000 | 0.000 | 0.259 | 0.000 | 0.000 | 0.000 | 0.000 | 0.000 | — | 0.000 | 0.000 |
| 10 | 0.000 | 0.000 | 0.000 | 0.000 | 0.000 | 0.000 | 0.000 | 0.000 | 0.000 | 0.000 | — | 0.000 |
| 11 | 0.823 | 0.000 | 0.968 | 0.000 | 0.943 | 0.000 | 0.250 | 0.952 | 0.972 | 0.000 | 0.000 | — |
| 12 | 0.000 | 0.000 | 0.000 | 0.000 | 0.000 | 0.000 | 0.000 | 0.000 | 0.000 | 0.000 | 0.000 | 0.000 |
| 13 | 0.000 | 0.000 | 0.000 | 0.000 | 0.000 | 0.000 | 0.000 | 0.000 | 0.000 | 0.000 | 0.000 | 0.000 |
| 14 | 0.000 | 0.000 | 0.000 | 0.039 | 0.000 | 0.000 | 0.000 | 0.000 | 0.000 | 0.000 | 0.000 | 0.000 |
| 15 | 0.000 | 0.000 | 0.000 | 0.084 | 0.000 | 0.000 | 0.000 | 0.000 | 0.000 | 0.331 | 0.000 | 0.000 |
| 16 | 0.810 | 0.000 | 0.961 | 0.000 | 0.943 | 0.000 | 0.240 | 0.977 | 0.992 | 0.000 | 0.000 | 0.978 |
| 17 | 0.770 | 0.000 | 0.975 | 0.000 | 0.953 | 0.000 | 0.311 | 0.969 | 0.984 | 0.000 | 0.000 | 0.974 |
| 18 | 0.000 | 0.000 | 0.000 | 0.000 | 0.000 | 0.000 | 0.000 | 0.000 | 0.000 | 0.000 | 0.000 | 0.000 |
| 19 | 0.000 | 0.611 | 0.000 | 0.000 | 0.000 | 0.000 | 0.000 | 0.000 | 0.000 | 0.000 | 0.000 | 0.000 |

| | 12 | 13 | 14 | 15 | 16 | 17 | 18 | 19 | tot |
|---|---|---|---|---|---|---|---|---|---|
| 0 | 0.000 | 0.000 | 0.000 | 0.000 | 0.810 | 0.770 | 0.000 | 0.000 | 6.433 |
| 1 | 0.000 | 0.000 | 0.000 | 0.000 | 0.000 | 0.000 | 0.000 | 0.611 | 1.611 |
| 2 | 0.000 | 0.000 | 0.000 | 0.000 | 0.961 | 0.975 | 0.000 | 0.000 | 7.771 |
| 3 | 0.000 | 0.000 | 0.039 | 0.084 | 0.000 | 0.000 | 0.000 | 0.000 | 1.000 |
| 4 | 0.000 | 0.000 | 0.000 | 0.000 | 0.943 | 0.953 | 0.000 | 0.000 | 7.673 |
| 5 | 0.000 | 0.000 | 0.000 | 0.000 | 0.000 | 0.000 | 0.000 | 0.000 | 1.000 |
| 6 | 0.000 | 0.000 | 0.000 | 0.000 | 0.240 | 0.311 | 0.000 | 0.000 | 2.903 |
| 7 | 0.000 | 0.000 | 0.000 | 0.000 | 0.977 | 0.969 | 0.000 | 0.000 | 7.773 |
| 8 | 0.000 | 0.000 | 0.000 | 0.000 | 0.992 | 0.984 | 0.000 | 0.000 | 7.889 |
| 9 | 0.000 | 0.000 | 0.000 | 0.331 | 0.000 | 0.000 | 0.000 | 0.000 | 1.000 |
| 10 | 0.000 | 0.000 | 0.000 | 0.000 | 0.000 | 0.000 | 0.000 | 0.000 | 1.000 |
| 11 | 0.000 | 0.000 | 0.000 | 0.000 | 0.978 | 0.974 | 0.000 | 0.000 | 7.860 |
| 12 | — | 0.000 | 0.000 | 0.000 | 0.000 | 0.000 | 0.000 | 0.000 | 1.000 |
| 13 | 0.000 | — | 0.000 | 0.061 | 0.000 | 0.000 | 0.000 | 0.000 | 1.000 |
| 14 | 0.000 | 0.000 | — | 0.000 | 0.000 | 0.000 | 0.000 | 0.000 | 1.000 |
| 15 | 0.000 | 0.061 | 0.000 | — | 0.000 | 0.000 | 0.000 | 0.000 | 1.000 |
| 16 | 0.000 | 0.000 | 0.000 | 0.000 | — | 0.975 | 0.000 | 0.000 | 7.876 |
| 17 | 0.000 | 0.000 | 0.000 | 0.000 | 0.975 | — | 0.000 | 0.000 | 7.910 |
| 18 | 0.000 | 0.000 | 0.000 | 0.000 | 0.000 | 0.000 | — | 0.000 | 1.000 |
| 19 | 0.000 | 0.000 | 0.000 | 0.000 | 0.000 | 0.000 | 0.000 | — | 1.611 |

Table 3 shows that of the three topics having the largest "tot" in Table 2 (e.g., topics {7, 8, 16}), topic 8 has the largest cosine similarity (tot=7.889). Thus, topic 8 may be selected as the representative topic to be kept. If the process 300 is being performed as a part of a process of reducing redundant topics, such as at 225 of process 200 discussed above, the topic identified as a representative topic may be assigned to the non-redundant set of topics to be kept and displayed to a user at 220.

After the representative topic (e.g., topic 8), is selected as representative, each topic with a cnt value greater than zero (e.g., cnt>0) and a similarity value to the representative topic greater than the threshold (e.g., similarity to topic 8>T) may be grouped with the representative topic and classified as redundant at 315. Table 2 illustrates that each of topics {0, 2, 4, 6, 11, 16, 17} have the similarity values connecting each of these topics to topic 8 that exceeds the threshold. For example, topic 0 is connected to topic 8 by a similarity value that exceeds the threshold T (e.g., similarity=0.67), topic 2 is connected to topic 8 by a similarity value that exceeds the threshold T (e.g., similarity=0.82), etc. Thus in an example implementation, topics {0, 2, 4, 6, 11, 16, 17} may be grouped together and classified as redundant at 315. If the process 300 is being performed as a part of a process of reducing redundant topics, such as at 225 of process 200 discussed above, the topics identified as redundant may be categorized as redundant at 230, the process 200 may end with respect to those topics. In some example implementations, redundant topics may be saved, but not displayed at 230.

Additionally, the data also illustrates that topics {1, 19} do not have similarity values to the representative topic greater than the threshold (e.g., similarity to topic 8<T). For example, topic 1 is connected to topic 8 by a similarity value that does not exceed the threshold T (e.g., similarity=0.00), and topic 19 is connected to topic 8 by a similarity value that does not exceed the threshold T (e.g., similarity=0.00). Thus in an example implementation, topics {1, 19} may not be grouped together with topic 8 and classified as redundant at 315 during a first iteration of the process 300.

After the topics having similarity values relative to the representative topic have been grouped and classified as redundant, the overall group topic and word probabilities may optionally be updated at 320 to reflect the revised topic set produced by removing the redundant topics. For example, the process discussed above with respect to 125 of FIG. 1 may be used to update the overall group topic and word probabilities.

After the in the group are classified as redundant (and the group topic and word probabilities have optionally been updated), a determination is made whether there are any ungrouped topics with similarity values exceeding the threshold at 330. If there are any ungrouped topics with similarity values exceeding the threshold (YES at 330), the process 300 may return to 305 to be repeated with respect to the remaining ungrouped topics. For example, as mentioned above, the data in Table 2 illustrates that topics {1, 19} have non-zero cnt values (e.g., cnt=1) and similarity values exceeding the threshold T but are not redundant with representative topic 8. Steps 305-320 may be repeated with respect to topics {1, 19} with topic 19 being selected as the representative topic at 310 and topic 1 being grouped with topic 19 and classified as redundant at 315.

Returning to 330, if there are not any ungrouped topics with similarity values exceeding the threshold (NO at 330), the process 300 may end. If the process 300 is being performed as a part of a process of reducing redundant topics, such as at 225 of process 200 discussed above, process 200 may end completely. After the process 200 has ended, the produced non-redundant set of topics to be kept maybe displayed to a user in another process, such as process 100 of FIG. 1. Table 4 below illustrates an example of the non-redundant set of topics based on the topics from Table 1.

TABLE 4

| 3 (yes 0.04) | (cors 0.03) | (transactional 0.03) | (value 0.02) | (need 0.03) |
|---|---|---|---|---|
| 5 (server 0.12) | (stores 0.03) | (store 0.03) | (php 0.03) | (cookies 0.03) |
| 8 (first 0.05) | (line 0.06) | (building 0.03) | (top 0.02) | (different 0.02) |
| 9 (sounds 0.12) | (post 0.12) | (like 0.12) | (yes 0.12) | (line 0.00) |
| 10 (espresso 0.04) | (hard 0.04) | (empty 0.04) | (understand 0.04) | (actually 0.04) |
| 12 (ok 0.10) | (thanks 0.05) | (great 0.05) | (place 0.04) | (bunch 0.04) |
| 13 (basic 0.10) | (auth 0.05) | (authorization 0.05) | (posterity 0.05) | (answer 0.05) |
| 14 (head 0.26) | (opens 0.05) | (recognition 0.04) | (speech 0.04) | (going 0.04) |
| 15 (page 0.04) | (login 0.03) | (url 0.03) | (like 0.03) | (go 0.02) |
| 18 (try 0.11) | (setting 0.05) | (work 0.05) | (resume 0.02) | (doctor 0.02) |
| 19 (recorded 0.04) | (think 0.08) | (recording 0.04) | (recordings 0.04) | (meeting 0.04) |
| 3 (access 0.02) | (mean 0.02) | (api 0.02) | (see 0.02) | (npm 0.01) |
| 5 (similar 0.03) | (js 0.02) | (html 0.02) | (language 0.02) | (using 0.02) |
| 8 (set 0.02) | (same 0.02) | (now 0.03) | (matter 0.01) | (events 0.01) |
| 9 (first 0.00) | (building 0.00) | (now 0.I) | (different 0.00) | (set 0.00) |
| 10 (statements 0.03) | (shared 0.03) | (seems 0.03) | (image 0.03) | (helps 0.03) |
| 12 (wherever 0.03) | (people 0.03) | (wonder 0.03) | (feel 0.02) | (cool 0.02) |
| 13 (use 0.05) | (email 0.05) | (password 0.05) | (control 0.02) | (oh 0.01) |
| 14 (google 0.02) | (access 0.03) | (api 0.02) | (techcrunch 0.01) | (nuance 0.00) |
| 15 (tokens 0.02) | (cookie 0.02) | (post 0.02) | (password 0.02) | (need 0.02) |
| 18 (normal 0.02) | (runs 0.02) | (time 0.02) | (patient 0.02) | (next 0.02) |
| 19 (working 0.03) | (show 0.03) | (order 0.03) | (format 0.03) | (given 0.03) |

Figure 4:
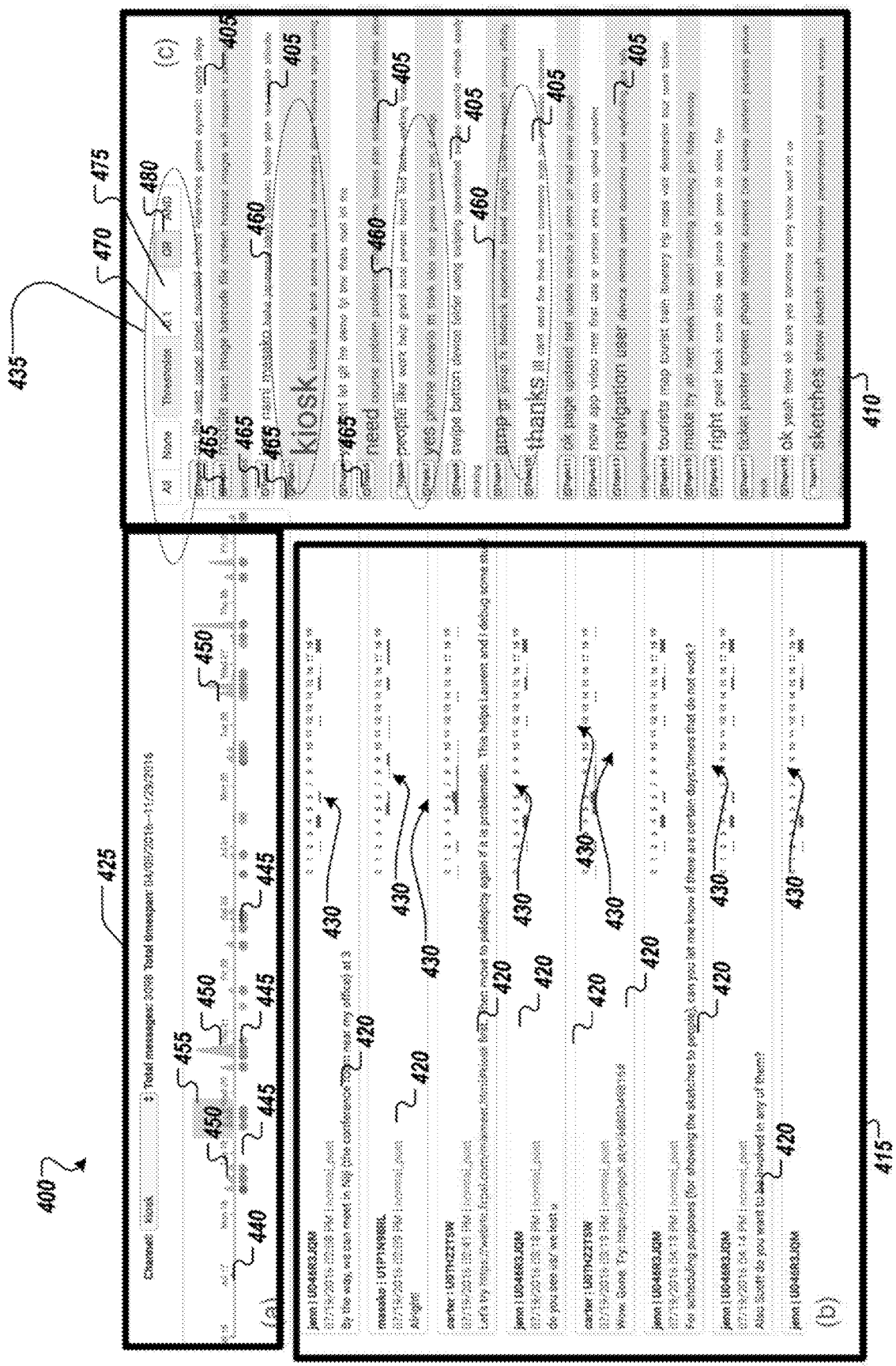
FIG. 4 illustrates a user interface (UI) usable in example implementations of the present application.

FIG. 4 illustrates a user interface (UI) 400 usable in example implementations of the present application. The UI 400 may be produced using the processes 100 and 200 discussed above and may be displayed on a computing device such as a personal computer, a server, a mainframe, or any other computing device that might be apparent to a person of ordinary skill in the art. The UI 400 may include three main parts: (a) a Timeline region 425 showing all content items along time, (b) a content region 415 displaying the contents items 420 and their topic distributions 430, and (c) a topics region 410 allowing a user to interactively browse the data by selecting topics 405 of interests and setting probability thresholds using a control buttons 435. As illustrated, the computed topics 405 (not all labeled) are then presented in the topics region 410 of the UI 400 to ease the exploration of the original data, (e.g., the content items 420) displayed in the content region 415 of the UI 400. This may allow a user to further make sense of the topics and better characterize the topics visually.

In the Timeline region 425, content items 420 are encoded as dots 445 along a time axis 440 and the dots 445 are shaded to indicate a content item type, such as a file share, normal post, channel join, etc. The volume of content items may also be shown as spikes 450 above the dots 445, reflecting the temporal burstiness of content items. This complements the dots 445 because a large number of content items 420 can exist in a short amount of time, resulting in visual clutter of the dots 445. A user may further control an interactive gray time window 455 to choose content items 420 to see in the content region 415 and perform zooming and panning along the time axis 440.

In the content region 415, in addition to the actual content of the content items 420 (e.g., text, user, and timestamp of a content item), the topic distribution 430 information 430 is presented in a bar chart and the height of the bars indicates the topical probabilities of this post. This may allow a user to compare content items 420 based on their topics 405. Content items shown in this view are determined by the time window 455 (if any) illustrated in the Timeline region.

The topics region 410 is an important part of the visualization that enables a user to browse all the topics 420 as well as manipulate how content items are shown in the other two regions. Each content item 420 is shown with its terms 460, the font size mapping to term probability in that topic 420. Several interface controls 435 are available for a user to perform data browsing based on the computed topics.

A user can leverage the checkboxes 465 to select topics 420 of interests, which may then hides content items in the other two regions not belonging to the selected topics. A process 500 of updating the UI 400 based on the checkboxes 465 and the selected topics 420 of interest is discussed in greater detail below.

Further, a user can set probability thresholds for the selected topics 420 using a text entry field 470. Thus, only posts with topical probabilities above the thresholds set in text entry field 470 can be revealed in the content region 415 and timeline region 425 of the UI 400. Moreover, a user can determine a logical combination of the criteria set with each topic, (e.g., AND/OR operations) using control buttons 475, 480. With the AND operation (control button 480), a content item 420 must satisfy the threshold setting for every selected topic 420, whereas with the OR operation (control button 475) requires the threshold setting be satisfied for least one of the topics.

As the topic selection process may be abstract and complicated, especially with the logical operations (AND/OR), the interface 400 may also provide a visual widget 600 (illustrated in FIG. 6) to facilitate such user input. This visual widget 600 is discussed in greater detail below with respect to FIG. 6.

Figure 5:
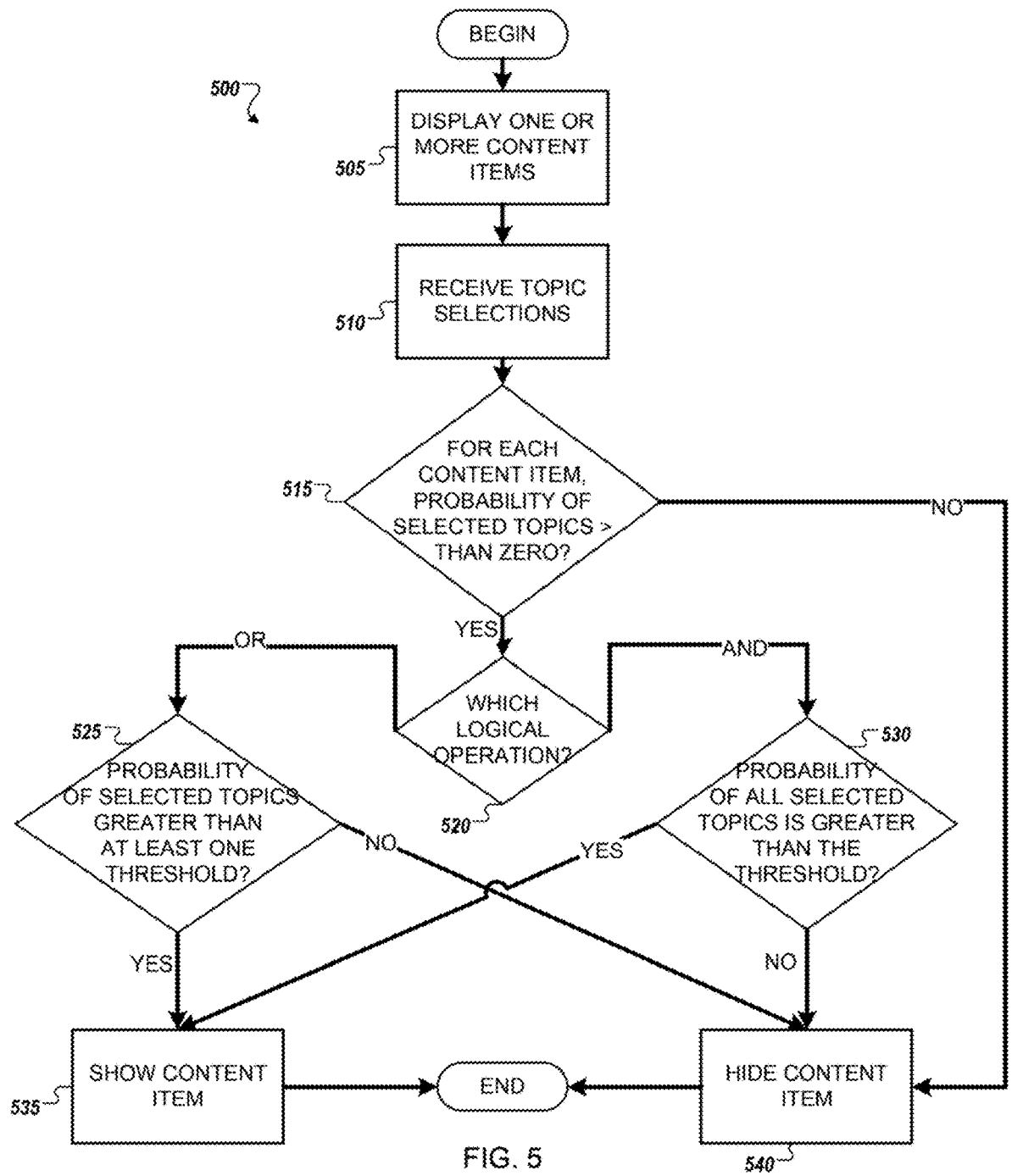
FIG. 5 illustrates a flowchart of a process for determining whether to show or hide content items according to example implementations of the present application.

FIG. 5 illustrates a flowchart of a process 500 for determining whether to show or hide posts according to example implementations of the present application. The process 500 may be used to update a UI, such as UI 400 discussed above with respect to FIG. 4. The illustrated process 500 may be performed by a processor (such as processors 70) of a device (such as computing device 705 of FIG. 7) to provide topic calculation and user-oriented browsing.

In the process 500, one or more content items may be displayed on a UI, such as UI 400 of FIG. 4 above, at 505.

The one or more content items may be a chat post, blog post, instant message, email message, social media post, or any other type of document that might be apparent to a person of ordinary skill in the art. The content item may include text, audio, image, video or any other type of content that might be apparent to a person of ordinary skill in the art. Additionally, each content item may be associated with one or more probabilities representative of one or more topics.

Using the UI, topic selections may be received at 510. For example, a user may select topics 405 using the check boxes 465 illustrated in the UI 400 of FIG. 4 discussed above. After the topic selections are received, the one or more content items are evaluated at 515 to determine if the content item is associated with a non-zero probability representative of the selected topic. If none of the probabilities associated with a content item is a non-zero probability representative of the selected topics (NO at 515), the content item is hidden from the UI at 540 and the process may end for the content item.

Conversely, if at least one of the probabilities associated with the content item is a non-zero probability representative of the selected topics (YES at 515), a determination is made to determine whether an "OR" or an "AND" operation has been selected using the UI at 520.

If the "OR" operation is detected at 520, the one or more content items are evaluated at 525 to determine if the content item is associated with a probability value representative of at least one of the selected topic that exceeds a threshold value specified using the UI. If none of the probabilities associated with a content item is a probability representative of at least one selected topics that exceeds the threshold (NO at 525), the content item is hidden from the UI at 540 and the process may end for the content item. Conversely, if the probabilities associated with the content item include a probability representative of at least one of the selected topics that exceeds the threshold (YES at 525), the content item is displayed on the UI at 535 and the process may end for the content item.

If the "AND" operation is detected at 520, the one or more content items are evaluated at 530 to determine if the content item is associated with a probability value greater than the threshold for all of the selected topics. If at least one of the probabilities associated with a content item is a probability representative of at least one selected topics that does not exceeds the threshold (NO at 530), the content item is hidden from the UI at 540 and the process may end for the content item. Conversely, if the probabilities associated with the content item that are representative of all of the selected topics exceeds the threshold (YES at 530), the content item is displayed on the UI at 535 and the process may end for the content item. After all of the content items have been processed using the process 500, The UI may remain static until additional input is received from a user.

Figure 6:
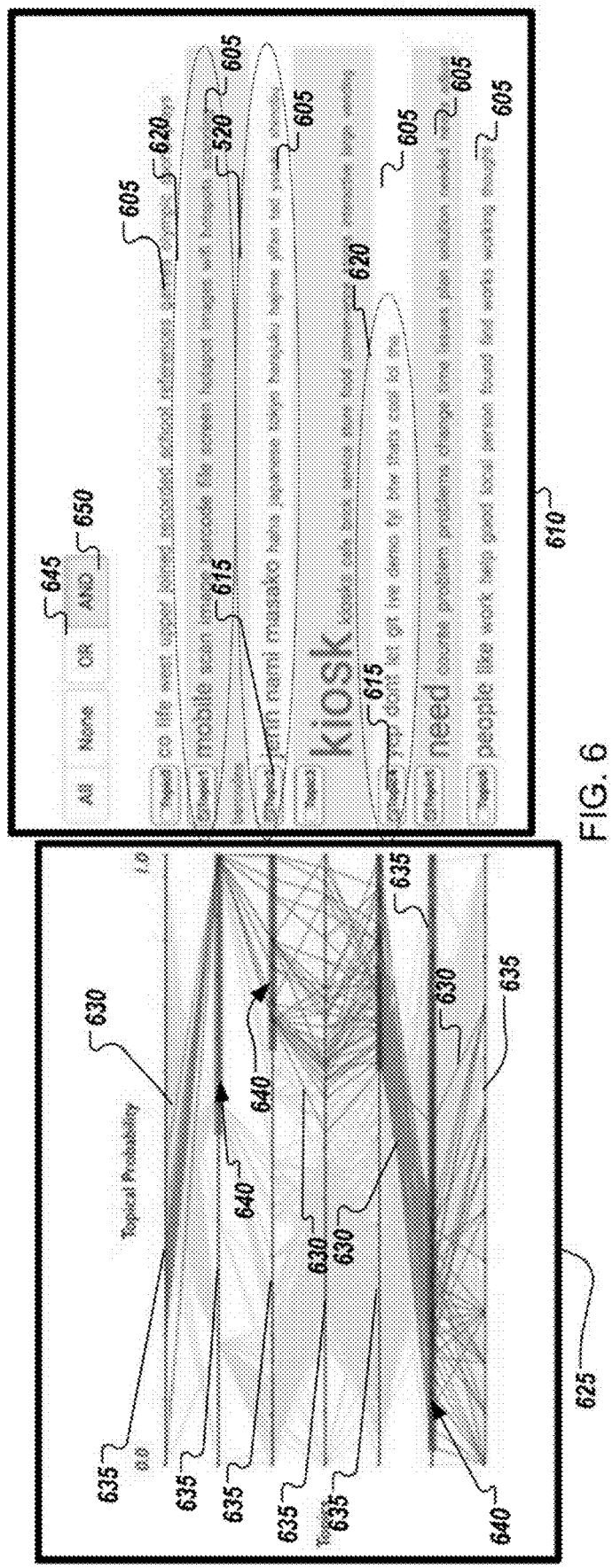
FIG. 6 illustrates another UI usable in example implementations of the present application.

FIG. 6 illustrates another UI 600 usable in example implementations of the present application. In some example implementations, UI 600 may be a visual widget of the UI 400 illustrated in FIG. 4. As discussed above, topic selection process may be abstract and complicated, especially with the logical operations (AND/OR), and a visual widget (UI 600) may be provided to facilitate user input. The UI 600 may be used to displays content items and topics based on parallel coordinates. As illustrated, the UI 600 includes a topics region 610 that includes a plurality of topics 605, each topic 605 illustrating the keywords associated with the topic 605 and check box 615 that may be used to select or deselect a topic.

The UI 600 also includes content item distribution region 625 that displays a topical probability distribution of the content items. Each axis 635 indicates a topic 605, and each post is shown as a line 630 passing through these topic axes 635 with the intersecting positions corresponded to its topical probabilities. A user can interactively initiate threshold windows, shown as boxes 640 with borders, and dynamically adjust the thresholds by dragging them. Threshold windows 640 can be only created on axes 635 of selected topics 605, and the logical AND/OR operations may be is specified with switch buttons 645,650 on top. All posts satisfying the criteria are highlighted in black, whereas others are colored in gray. In addition, while thresholds are shown with lower bounds, thresholds with both upper and lower bounds can be specified in a similar manner using the threshold windows 640.

Example Computing Environment

Figure 7:
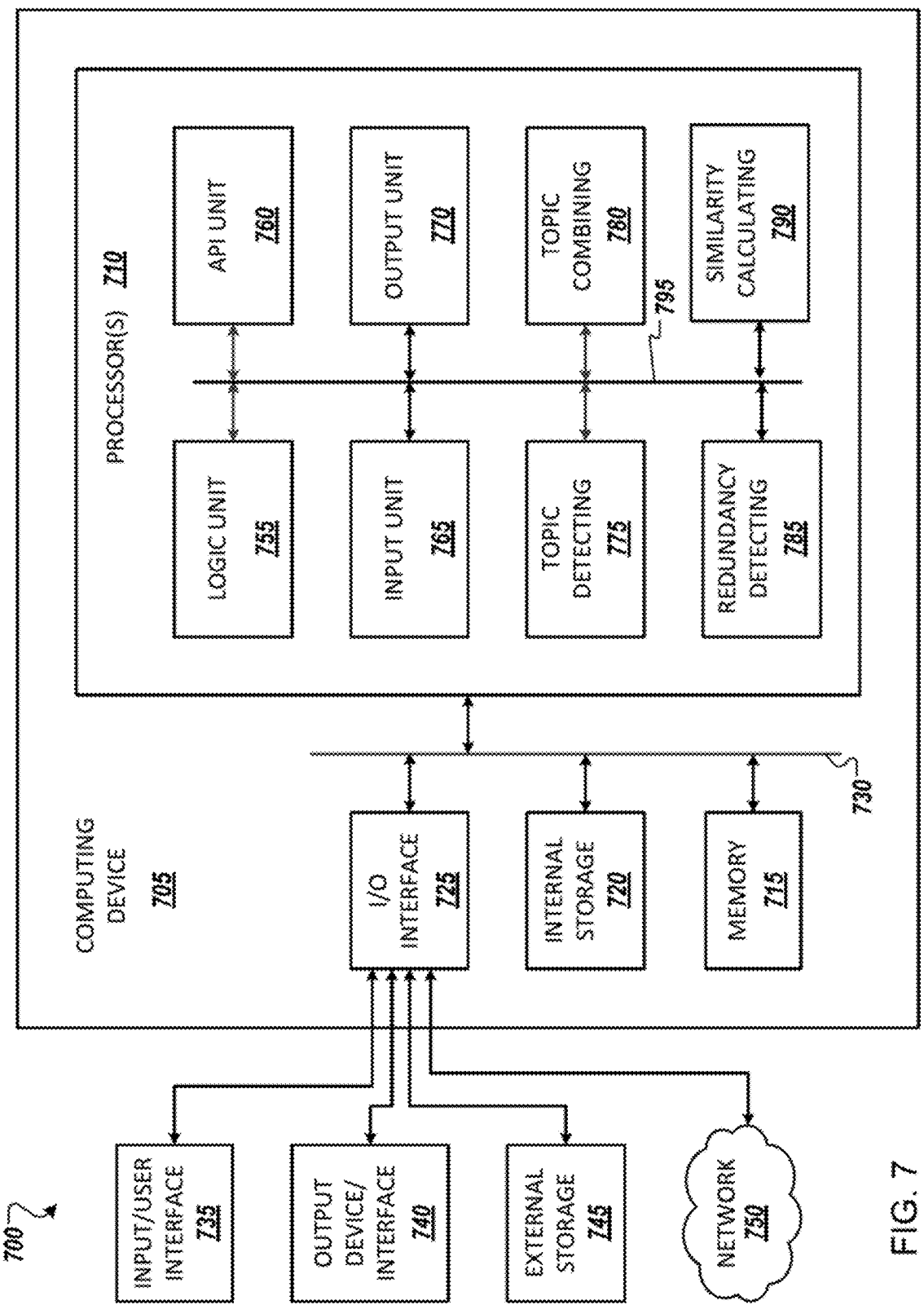
FIG. 7 illustrates an example computing environment with an example computer device suitable for use in some example implementations.

FIG. 7 illustrates an example computing environment 700 with an example computer device 705 suitable for use in some example implementations. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705.

Computing device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, which can be used to provide input (e.g., buttons, touchscreen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computing device 705. In other example implementations, other computing devices may function as or provide the functions of input/user interface 735 and output device/interface 740 for a computing device 705.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMAX, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 755, application programming interface (API) unit 760, input unit 765, output unit 770, topic detecting unit 775, topic combining unit 780, redundancy detecting unit 785, similarity calculating unit 790, and inter-unit communication mechanism 795 for the different units to communicate with each other, with the OS, and with other applications (not shown). For example, topic detecting unit 775, topic combining unit 780, redundancy detecting unit 785, and similarity calculating unit 790 may implement one or more processes shown in FIGS. 1, 2, 3 and 5. The described units and elements can be varied in design, function, configuration, or implementation and are not limited to the descriptions provided.

In some example implementations, when information or an execution instruction is received by API unit 760, it may be communicated to one or more other units (e.g., logic unit 755, input unit 765, output unit 775, topic detecting unit 775, topic combining unit 780, redundancy detecting unit 785, and similarity calculating unit 790). For example, when a content item is received or detected by the input unit 765, the content item may be provided to the topic detecting unit 775. Further, the topic detecting unit 775 may provide each detected topic to the topic combining unit 780. Further, the redundancy detecting unit 785 may receive the combined topics from the topic combining unit 780. The similarity calculating unit 790 may provide similarity information for the combined topics 780 to the redundancy detecting unit 785 for use in detecting redundant claims.

In some instances, the logic unit 755 may be configured to control the information flow among the units and direct the services provided by API unit 760, input unit 765, output unit 770, topic detecting unit 775, topic combining unit 780, redundancy detecting unit 785, similarity calculating unit 790, and inter-unit communication mechanism 795 in some example implementations described above. For example, the flow of one or more processes or implementations may be controlled by logic unit 755 alone or in conjunction with API unit 760.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method of displaying a plurality of content items, the method comprising:
   detecting at least one topic associated with each of the plurality of content items, each of the at least one topic characterized by topic terms;
   generating a set of topics based on the at least one topic associated with each of the plurality of content items, the set of topics comprising a number of topics associated with the plurality of content items;
   for each respective topic of the set of topics, calculating similarity scores between topic terms of each respective topic and topic terms of one or more other topics in the set of topics, wherein the calculating the similarity scores includes:
      calculating a first similarity score between topic terms associated with a first topic in the set of topics and topic terms associated with a second topic in the set of topics;
      calculating a second similarity score between the topic terms associated with the second topic and topic terms associated with a third topic in the set of topics; and
      calculating a third similarity score between the topic terms associated with the first topic and the topic terms associated with the third topic;
   reducing the number of topics in the set of topics by combining at least one topic with the one or more other topics in the set of topics in response to a determination that the at least one topic is redundant based, in part, on the calculated similarity scores between topic terms of the at least one topic and the one or more other topics exceeding a first threshold, wherein the first threshold is a non-zero threshold, and wherein the reducing the number of topics includes:
      determining the first topic, the second topic, and the third topic are redundant when each of the first similarity score, the second similarity score, and the third similarity score exceed the first threshold;
      calculating a first total similarity value associated with the first topic based on a summation of the first similarity score and the third similarity score;
      calculating a second total similarity value associate with the second topic based on a summation of the first similarity score and the second similarity score;
      calculating a third total similarity value associated with the third topic based on a summation of the second similarity score and the third similarity score;
      determining a largest similarity value from the first total similarity value, the second total similarity value, and the third total similarity value;

selecting a representative topic from the first topic, the second topic, and the third topic based on the determination of the largest similarity value; and determining that a topic in the set of topics is non-redundant based, in part, on the calculated similarity scores between the topic and the one or more other topics in the set of topics is less than the first threshold;

calculating a topic distribution for each of the plurality of content items from the reduced set of topics; and generating a visualization, the visualization comprising a first region displaying visual representations of each topic in the reduced set of topics, each visual representation of each topic comprising a topic order indicator; and a second region displaying visual representations of a subset of content items of the plurality of content items, each visual representation of the subset of content items comprising a plurality of topic indicators that each correspond to a topic order indicator of the first region, each topic indicator comprising a graphical representation of the topic distribution of the corresponding topic in first region for a respective content item in the second region.

2. The method of claim 1, further comprising:

calculating a topic probability based on an association between each of the plurality of content items and the reduced set of topics.

3. The method of claim 1, wherein the generated visualization comprises an interactive user interface.

4. The method of claim 3, further comprising:

receiving a selection of one or more topics from the reduced set of topics via the interactive user interface;

updating the visualization, based on the received selection of the one or more topics from the reduced set of topics by displaying at least one content item associated with the selected one or more topics.

5. A non-transitory computer readable medium having stored therein a program for making a computer execute a method of displaying a plurality of content items, the method comprising:

detecting at least one topic associated with each of the plurality of content items, each of the at least one topic characterized by topic terms;

generating a set of topics based on the at least one topic associated with each of the plurality of content items, the set of topics comprising a number of topics associated with the plurality of content items;

for each respective topic of the set of topics, calculating similarity scores between topic terms of each respective topic and topic terms of one or more other topics in the set of topics, wherein the calculating the similarity scores includes:

calculating a first similarity score between topic terms associated with a first topic in the set of topics and topic terms associated with a second topic in the set of topics;

calculating a second similarity score between the topic terms associated with the second topic and topic terms associated with a third topic in the set of topics; and calculating a third similarity score between the topic terms associated with the first topic and the topic terms associated with the third topic;

reducing the number of topics in the set of topics by combining at least one topic with the one or more other topics in the set of topics in response to a determination that the at least one topic is redundant based, in part, on the calculated similarity scores between topic terms of the at least one topic and the one or more other topics exceeding a first threshold, wherein the first threshold is a non-zero threshold, and wherein the reducing the number of topics includes:

determining the first topic, the second topic, and the third topic are redundant when each of the first similarity score, the second similarity score, and the third similarity score exceed the first threshold;

calculating a first total similarity value associated with the first topic based on a summation of the first similarity score and the third similarity score;

calculating a second total similarity value associate with the second topic based on a summation of the first similarity score and the second similarity score;

calculating a third total similarity value associated with the third topic based on a summation of the second similarity score and the third similarity score;

determining a largest similarity value from the first total similarity value, the second total similarity value, and the third total similarity value;

selecting a representative topic from the first topic, the second topic, and the third topic based on the determination of the largest similarity value; and determining that a topic in the set of topics is non-redundant based, in part, on the calculated similarity scores between the topic and the one or more other topics in the set of topics is less than the first threshold;

calculating a topic distribution for each of the plurality of content items from the reduced set of topics; and generating a visualization, the visualization comprising a first region displaying visual representations of each topic in the reduced set of topics, each visual representation of each topic comprising a topic order indicator; and a second region displaying visual representations of a subset of content items of the plurality of content items, each visual representation of the subset of content items comprising a plurality of topic indicators that each correspond to a topic order indicator of the first region, each topic indicator comprising a graphical representation of the topic distribution of the corresponding topic in first region for a respective content item in the second region.

6. The non-transitory computer readable medium of claim 5, wherein the generated visualization comprises an interactive user interface.

7. The non-transitory computer readable medium of claim 6, further comprising:

receiving a selection of one or more topics from the reduced set of topics via the interactive user interface;

updating the visualization, based on the received selection of the one or more topics from the reduced set of topics, by displaying at least one content item associated with the selected one or more topics.

8. The non-transitory computer readable medium of claim 7, wherein the generated visualization further comprises a topical probability distribution of the at least one content item associated with the selected one or more topics.

9. A computing device configured to display a plurality of content items, the computing device comprising:

a memory configured to store a plurality of content items;
a processor executing a process comprising:
  detecting at least one topic associated with each of the plurality of content items, each of the at least one topic characterized by topic terms;
  generating a set of topics based on the at least one topic associated with each of the plurality of content items, the set of topics comprising a number of topics associated with the plurality of content items;
  for each respective topic of the set of topics, calculating similarity scores between topic terms of each respective topic and topic terms of one or more other topics in the set of topics, wherein the calculating the similarity scores includes:
    calculating a first similarity score between topic terms associated with a first topic in the set of topics and topic terms associated with a second topic in the set of topics;
    calculating a second similarity score between the topic terms associated with the second topic and topic terms associated with a third topic in the set of topics; and
      calculating a third similarity score between the topic terms associated with the first topic and the topic terms associated with the third topic;
  reducing the number of topics in the set of topics by combining at least one topic with the one or more other topics in the set of topics in response to a determination that the at least one topic is redundant based, in part, on the calculated similarity scores between topic terms of the at least one topic and the one or more other topics exceeding a first threshold, wherein the first threshold is a non-zero threshold, and wherein the reducing the number of topics includes:
    determining the first topic, the second topic, and the third topic are redundant when each of the first similarity score, the second similarity score, and the third similarity score exceed the first threshold;
    calculating a first total similarity value associated with the first topic based on a summation of the first similarity score and the third similarity score;
    calculating a second total similarity value associate with the second topic based on a summation of the first similarity score and the second similarity score;
    calculating a third total similarity value associated with the third topic based on a summation of the second similarity score and the third similarity score;
    determining a largest similarity value from the first total similarity value, the second total similarity value, and the third total similarity value;
      selecting a representative topic from the first topic, the second topic, and the third topic based on the determination of the largest similarity value; and
    determining that a topic in the set of topics is non-redundant based, in part, on the calculated similarity scores between the topic and the one or more other topics in the set of topics is less than the first threshold;
  calculating a topic distribution for each of the plurality of content items from the reduced set of topics; and
  generating a visualization, the visualization comprising
    a first region displaying visual representations of each topic in the reduced set of topics, each visual representation of each topic comprising a topic order indicator; and
    a second region displaying visual representations of a subset of content items of the plurality of content items, each visual representation of the subset of content items comprising a plurality of topic indicators that each correspond to a topic order indicator of the first region, each topic indicator comprising a graphical representation of the topic distribution of the corresponding topic in first region for a respective content item in the second region.

10. The computing device of claim 9, wherein the generated visualization comprises an interactive user interface.

11. The computing device of claim 10, further comprising:
  receiving a selection of one or more topics from the reduced set of topics via the interactive user interface;
  updating the visualization, based on the received selection of the one or more topics from the reduced set of topics by displaying at least one content item associated with the selected one or more topics.

12. The method of claim 1, wherein each visual representation of each topic comprises the topic terms of the respective topic, each topic term having a font size based on a term probability of the respective topic term for that topic.

13. The method of claim 1, wherein the content items included in the subset of content items of the second region is based on selecting one or more of the reduced set of topics in the first region and having the topic distribution of the selected one or more of the reduced set of topics for each respective content item being over a probability threshold.

14. The method of claim 13, wherein displaying the visual representations of the subset of content items of the plurality of content items comprises:
  in response to selecting, from within the first region, one or more of the reduced set of topics displayed in the first region, displaying only content items having a topic distribution of the selected one or more of the reduced set of topics exceeding the probability threshold.

* * * * *